US006767626B2

(12) United States Patent
Tuminello et al.

(10) Patent No.: US 6,767,626 B2
(45) Date of Patent: Jul. 27, 2004

(54) METHOD FOR PROTECTION OF STONE WITH SUBSTANTIALLY AMORPHOUS FLUOROPOLYMERS

(75) Inventors: William Howard Tuminello, Newark, DE (US); Robert Clayton Wheland, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/258,250

(22) PCT Filed: May 15, 2001

(86) PCT No.: PCT/US01/15772

§ 371 (c)(1),
(2), (4) Date: Oct. 21, 2002

(87) PCT Pub. No.: WO01/87801

PCT Pub. Date: Nov. 22, 2001

(65) Prior Publication Data

US 2003/0211332 A1 Nov. 13, 2003

Related U.S. Application Data

(60) Provisional application No. 60/204,447, filed on May 15, 2000.

(51) Int. Cl.⁷ .......................... B32B 27/08; B32B 27/30; B32B 31/00; B05D 3/00

(52) U.S. Cl. ...................... 428/336; 428/421; 428/422; 428/540; 427/393.6

(58) Field of Search ................. 428/336, 421, 428/422, 540; 427/393.6; 526/254; 524/545, 546

(56) References Cited

U.S. PATENT DOCUMENTS

| 4,499,146 A | | 2/1985 | Piacenti et al. |
| 4,745,009 A | | 5/1988 | Piacenti et al. |
| 4,746,550 A | | 5/1988 | Strepparola et al. |
| 4,764,431 A | | 8/1988 | Piacenti et al. |
| 4,902,538 A | | 2/1990 | Piacenti et al. |
| 5,212,016 A | * | 5/1993 | Mascia et al. ............... 428/422 |
| 6,127,000 A | * | 10/2000 | Carbonell et al. ........ 427/393.6 |

OTHER PUBLICATIONS

SAFETEC MSDS for Viton a fluoroelastomer, Sep. 1990.*
F. Ciardelli, et al., New fluorinated acrylic polymers for improving weatherability of building slone material, Progress in Organic Coatings (vol. 32) 1997, pp. 43–50 Pisa, Italy.

\* cited by examiner

*Primary Examiner*—Ramsey Zacharia

(57) ABSTRACT

This invention concerns the application of substantially amorphous fluoropolymer compositions to stone so as to protect the stone from the deleterious effects of water and pollution.

12 Claims, No Drawings

METHOD FOR PROTECTION OF STONE WITH SUBSTANTIALLY AMORPHOUS FLUOROPOLYMERS

This application claims the benefit of Provisional Application No. 60/204,447, filed May 15, 2000.

FIELD OF THE INVENTION

This invention concerns the application of substantially amorphous fluoropolymer compositions to stone in order to protect the stone from the deleterious effects of water and pollution. This invention is useful for the preservation of historic monuments, buildings, and sculptures and for the construction of weather and pollution resistant stone construction materials.

TECHNICAL BACKGROUND OF THE INVENTION

It has long been recognized that a combination of manmade and natural atmospheric conditions are having deleterious effects on stone structures including many monuments of considerable artistic and historical importance. A variety of efforts have been undertaken over the years to identify ways to protect and preserve these structures, but these efforts have met with only partial success. Most recently, a well-organized and concerted effort has been undertaken by Piacenti and coworkers, with sponsorship from the Target Project for the Cultural Heritage of the Consiglio Nazionale della Recerche of Rome, Italy, and represents the current state of the art.

The deleterious effects of water, in the form of both rainfall and condensation, are of primary concern, although organic pollutants are also of concern. For example, all building materials are subject to stress and concomitant cracking resulting from penetration by water followed by cycles of freezing and thawing. Also, water in combination with $CO_2$, which occurs naturally, and nitrous and sulfurous gases, which are man-made pollutants, forms acids which rapidly eat away at the stone.

A successful attack on the problem will necessitate some tradeoffs. While it is highly desirable to minimize the contact between water and stone, by achieving maximum water repellency, it is also necessary to provide high water vapor permeability in order to permit venting of that water which finds its way into the microstructure of the stone. Substances with high permeability to water vapor are often not those of the highest water repellency. High resistance to acid and abrasion are also of considerable importance. Furthermore, cost of materials is a factor in any practical application. And, for several reasons, the smaller the amount of material required to achieve the desired effect, the better.

There are other tradeoffs. For example, it is particularly desirable that the coating material coat but preferably not block the pores. To achieve this, a coating viscosity should be in a range which permits wetting of the pores via capillary action. High wetting is also required to ensure thorough and uniform coverage. However, the coating must be provided with sufficient adhesion to the outside surface upon which it is deposited that at least some amount will remain thereon.

Other requirements for such materials include chemical inertness, low volatility, photooxidative stability and thermal stability. There should also be sufficient solubility in environmentally friendly solvents for the purposes of both application and subsequent removal if warranted. The coating must also be clear and colorless, and remain so for its lifetime. In the current state of the art, the application solvent of choice is supercritical $CO_2$, as described in Carbonell et al., WO 99/19080.

In a series of patents, U.S. Pat. No. 4,499,146, U.S. Pat. No. 4,746,550, U.S. Pat. No. 4,745,009, U.S. Pat. No. 4,902,538, Piacenti et al. disclose compositions based upon perfluoropolyethers having molecular weights in the range of 500–5000 for use in the protection of stone from the effects of water and atmospheric pollutants. In the art of Piacenti, excellent combinations of water repellency and water vapor permeability are achieved.

In U.S. Pat. No. 4,902,538, good results are achieved in compositions having highly crystalline particles of polytetrafluoroethylene and copolymers thereof intermixed with the perfluoropolyethers. However, when stone of porosity of greater than ca. 30% is treated, impractically high levels of coating material are required to achieve the desired coverage with the desired water repellency. Levels in the range of at least 150 $g/m^2$ are disclosed, more than 10 times the amount required for low-porosity marble. The effect of this high coating level on permeability is not disclosed. Its effect on cost, however, is clearly undesirable. Furthermore, use of highly crystalline polymers, such as polytetrafluoroethylene, is undesirable because, unless they are sintered at high temperatures, they will be too readily susceptible to removal from the treated surface by abrasion and erosion. Further still, they are not readily soluble in the delivery medium of choice, $CO_2$, or any other desirable medium.

Also disclosed in the art in Piacenti et al., U.S. Pat. No. 4,764,431, are copolymers of vinylidene fluoride which are less effective than the perfluoropolyethers.

Fluorinated acrylic polymers are disclosed by Ciardelli et al., Prog. in Org. Coatings, 32, 43–50 (1997). The polymers disclosed therein are characterized by hydrocarbon backbones and fluorinated pendant groups. These polymers exhibit similar functionality to the perfluoropolyethers.

Guidetti et al. disclose the use of polyfluorosubstantially amorphous fluoropolymers for protecting stone in "Polyfluorosubstantially amorphous fluoropolymers as stone protectives", 7th International Congress on Deterioration and Conservation of Stone, 1053-62 (1992).

There is considerable incentive in the art to discover new materials which possess several of the above attributes desired for the application.

SUMMARY OF THE INVENTION

The present invention provides a process for protecting stone comprising:

contacting stone with a substantially amorphous fluoropolymer comprising (a) at least about 10 mole percent of repeat units of the formula

(b) 0 to 50 mole percent of repeat units of the formula

and (c) about 10 to about 75 mol-% of repeat units selected from the group consisting of:

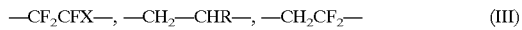

and mixtures thereof wherein X is H or perfluoroalkoxy having 1–20 carbons, and R is H, alkyl, alkoxy, perfluoroalkyl, F. Furthermore, the backbone H:F ratio should be about 0.3 to about 1.0. If the polymer MW is less than about 5000, the H:F ratio can be broader.

DETAILED DESCRIPTION

For the purpose of the present invention, the term "stone" means a natural stone used in construction or sculpture (such as granite, marble, limestone, or sandstone) as well as tile, cement, brick, stucco, and the like.

The method of the present invention provides surprising benefits over the methods of the art. In the method of the present invention, a substantially amorphous fluoropolymer composition is employed as a coating agent for stone in order to provide high liquid moisture barrier, good moisture vapor permeability, and resistance to environmental pollutants. The non-fugitive, very low areal density coating formed on the stone surface is surprisingly effective over the materials of the art. Furthermore, the substantially amorphous fluoropolymer of the present invention is readily soluble in a variety of solvents by virtue of its amorphous nature, and is thereby both readily applied in the form of an environmentally friendly solution and readily removed by conventional solvents should that be deemed necessary after application. Further still, the highly desirable effects of the method of the present invention are achieved employing a substantially amorphous fluoropolymer in relatively small quantities in order to achieve the desired combination of water vapor permeability and liquid water resistance.

The polymers suitable for use in the present invention are substantially amorphous, in contrast to most fluorinated polymers in common use which are known to be moderately to highly crystalline. One of skill in the art will appreciate that the degree of polymer crystallinity which can be tolerated in a given situation will depend upon the specific polymer structure, solvents, other adjuvants, application methods, requisites of the particular application, and substrate in a given practical embodiment of the invention. For the purpose of the present invention, amorphous polymers suitable for the practice of the invention may exhibit a melting endotherm having an associated heat of fusion no greater than 5 J/g, preferably no greater than 2 J/g, more preferably no greater than 1 J/g, at a temperature above about 20° C.

More preferably the polymers employed for the practice of the invention will exhibit no melting endotherm above about 100° C. Most preferably the polymers employed for the practice of the invention will exhibit no melting endotherm whatever.

For the purpose of the present invention, the heat of fusion is determined by differential scanning calorimetry (DSC) at a heating rate of 10° C./min, according to ASTM D4591-97.

DSC is also the technique of choice for determining the glass transition temperature. Glass transition temperatures of the polymer are preferably no higher than 30° C., most preferably no higher than 20° C. Glass transitions should be set by the methods herein described so that the polymer will not undergo repeated transitions while in place on the stone.

The polymers suitable for use in the present invention may be made via a continuous polymerization process, for example according to the teachings of Anolick et al., U.S. Pat. No. 5,663,255. Continuous polymerization reactors include continuous stirred tank reactors and pipeline (tubular) reactors, both of which are well-known in the art. The process is run at a pressure of about 41 to about 690 MPa, especially about 69 to about 103 MPa. At lower pressures the molecular weight of the polymers formed and the conversion of monomers to polymer both tend to decrease. Solvents can be used in the reactor. so that a polymer solution may be made in a single step. When solvents are used it is preferred that they be essentially inert under process conditions. Useful solvents include perfluorodimethylcyclobutane and perfluoro(n-butyltetrahydrofuran). A particularly useful solvent is $CO_2$.

The polymer is soluble in the monomer(s) under the process conditions. Therefore, one method of polymer isolation is to reduce the pressure below that required for solution of the polymer, and isolate the polymer from that, as by decantation, filtration or centrifugation.

The apparatus for running the polymerization may be any suitable pressure apparatus in which the reactant and products streams may be added and removed at appropriate rates. Thus the apparatus may be a stirred or unstirred autoclave, a pipeline type reactor, or other suitable apparatus. Agitation is not necessary, but preferable, especially to obtain polymers with low polydispersity. The material of construction should be suitable for the process ingredients, and metals such as stainless steel are often suitable.

The polymerization is carried out above about 200° C., and most preferably from about 250° to about 400° C. The initiator is chosen so that it will generate active free radicals at the temperature at which the polymerization is carried out. Such free radical sources, particularly those suitable for hydrocarbon vinyl monomers at much lower temperatures, are known to one of skill in the art, see for instance J. Brandrup, et al., Ed., Polymer Handbook, 3rd Ed., John Wiley & Sons, New York, 1989, p. II/1 to II/65. The preferred temperature for running the instant process depends on both the monomers and the initiator and is often a compromise between raising temperature to favor high productivities and high conversions and lowering temperature to minimize chain transfer and monomer degradation. For the copolymerization of HFP with TFE, for example, where chain transfer is not a problem, initiation by $C_2F_5SO_2$ $C_2F_5$ is a good choice on account of the very high productivities it affords at 400° C. For the polymerization of HFP/TFE/PMVE, however, where PMVE chain transfer is of prime concern, $NF_3$ which retains good efficiency at 250° C., is an excellent choice for initiator. Suitable free radical initiators include $NF_3$, $R_fNF_2$, $R_f^2NF$, $R_f^3N$, $R^1N=NR^1$, $R_fOOR_f$, perfluoropiperazine, and hindered perfluorocarbons of the formula $C_nF_{2n+2}$ wherein each $R_f$ is independently perfluoroalkyl, preferably containing 1 to 20 carbon atoms, hindered perfluoroalkenes of the formula $C_nF_{2n}$, perfluoro(dialkylsulfones) of the formula $R^1SO_2R^1$, perfluoroalkyl iodides of the formula $R^1I$, perfluoroalkylene diiodides of the formula IRI where the two iodides are not vicinal or geminal, perfluoro(dialkyldisulfides) $R^1SSR^1$, and perfluoroalkyl compounds containing nitrogen-sulfur bonds of the formula $R^{12}$ $NSR^1$, wherein each $R^1$ is independently saturated perfluorohydrocarbyl optionally containing one or more ether groups, isolated iodine, bromine or chlorine substituents, or perfluoroamino groups. By "saturated perfluorohydrocarbyl" is meant a univalent radical containing only carbon and fluorine and no unsaturated carbon—carbon bonds. The activity of any particular initiator molecule may be readily determined by minimal experimentation.

Preferred initiators are $NF_3R_f^2NF$, $R_fNF_2$, perfluoropiperazine, perfluoro(dialkylsulfones), i.e., $R^1SO_2R^1$, and hindered perfluorocarbons. $NF_3$ is an especially preferred initiator. If higher molecular weight polymers are desired, the initiator should preferably not have any groups present in its structure that cause any substantial chain transfer or termination during the polymerization. Such groups usually include, for instance, organic bromides or iodides or carbon-hydrogen bonds.

A useful range of initiator concentration has been found to be about 0.003 to about 0.5 g of initiator/kg monomer, preferably about 0.1 to about 0.3 g/kg. Higher or lower amounts are also useful depending upon the initiator, the monomers, goal molecular weights, process equipment, and process conditions used, and can readily be determined by experimentation. The initiator may be added to the reactor as a solution in the monomer(s).

Various comonomers (III) may be used in the polymerization process, and be incorporated into the polymer. Perfluoro(alkyl vinyl ethers) and perfluorinated terminal alkenes, each optionally substitited with ether, cyano, halo (other than fluorine), sulfonyl halide, hydrogen or ester groups may be used. Also unfluorinated or partially fluorinated olefins or vinyl ethers, optionally substituted as above, may also be used. Useful comonomers include $CF_2=CFOCF_2CF(CF_3)OCF_2CF_2SO_2F$, ethylene, vinylidene fluoride, $CH_2=CHO(C=O)CF_3$, methyl vinyl ether, $CFCl=CF_2$, $CH_2=CFCF_3$, $CH_2=CHCF_3$, $CH_2=CHCF_2\ CF_2\ CF_2\ CF_3$, $CH_2=CHCF_2\ CF_2\ Br$, $CF_2=CFCF_2\ CN$, and $CF_2=CFCF_2\ OCF_2\ CF_2\ SO_2F$. Any combination of ethylene, vinylidene fluoride, perfluoroalkylvinyl ethers, perfluorobutylethylene, alkylvinyl ethers and/or vinyl fluoride is preferred.

The properties of the polymer will be affected not only by the overall composition of the polymer, but by the distribution of the various monomer units in the polymer. The instant process yields a polymer in which the monomer units are fairly uniformly distributed in the polymer, which gives polymer with consistent properties. One measure of polymer uniformity is randomness of the monomer units in the polymer. A measure of this is relative amounts of isolated repeat units, diads, triads etc. By diads and triads are meant instances in which two or three repeat units from the same monomer, respectively, occur in the polymer.

Many of the polymers made by the process described herein have relatively small amounts of triads of repeat unit (I), which is of course derived from HFP. Thus, in such polymers, less than 20 mole percent of (I) is in the form of triads, and preferably less than about 15% and more preferably less than about 10%. As would be expected, in polymers with higher amounts of (I), there is a tendency towards higher triad content. The amount of triads in the polymer can be determined by $^{19}F$ NMR.

Polymers described herein often have a polydispersity of less than 5, preferably less than 4. Repeat units (III) help suppress crystallization and provides for a lower glass transition temperature. Preferred monomers for repeat unit (III) are vinyl fluoride, vinylidene fluoride, perfluoroalkylvinyl ethers, perfluorobutylethylene, alkylvinyl ethers and/or ethylene, with a mixture of at least two most preferred.

Since TFE is considerably more reactive in the polymerization than HFP, an excess of HFP is needed to achieve the desired polymer composition. Typically this also means that at the end of the polymerization, much or all of the TFE will have polymerized, but there will be a considerable amount of unpolymerized HFP. Typically the TFE will be about 1 to 15 mole percent of the total amount of monomer being fed to the process, with the HFP and other monomer(s) (if present) being the remainder. The average residence time is the average amount of time any of the material fed to the reactor actually spends in the reactor, and is a function of the volume of the reactor and the volumetric flow of the process ingredients through the reactor. A preferred residence time is about 20 sec to about 10 min, more preferably about 40 sec to about 2 min. When the process fluids are being added to the reactor, it is preferred if they are preheated just before they enter the reaction to a temperature somewhat less than that of the actual reactor temperature, about 20° C. to about 100° C. less. This allows one to maintain a uniform constant temperature in the reactor itself, and for the newly added materials to start the polymerization reaction immediately upon entry to the reactor.

The polymer suitable for the practice of the present invention, as so produced, comprises at least about 10 mole percent, preferably about 30 to about 50 mole percent, of monomer units derived from hexafluoropropylene, —$CF_2$—$CF(CF_3)$—. The polymer further comprises 0–50 mole percent, preferably 25–50 mole percent, of monomer units derived from tetrafluoroethylene, —$CF_2$—$CF_2$—. The polymer further comprises about 10–75 mole percent, preferably 10–25 mole percent of one or more monomer units (III) selected from the group consisting of:

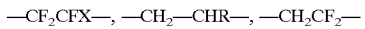

—$CF_2CFX$—, —$CH_2$—$CHR$—, —$CH_2CF_2$— wherein X is H or perfluoroalkoxy having 1–20 carbons, and R is H, alkyl, alkoxy, perfluoroalkyl, or F. Preferably (III) is a repeat unit derived from vinyl fluoride, vinylidene fluoride, alkyl, including fluoroalkyl, vinyl ethers, (perfluorobutyl) ethylene, or ethylene. Most preferably, a combination of at least two of these is employed.

One of skill in the art will appreciate that many compositions are encompassed within the range suitable for the practice of the present invention, and that, particularly at concentrations of HFP below 30 mol-%, not all such compositions will exhibit sufficient amorphous character to be suitable for the practice of the present invention, while others may have little practical value. However, since the repeat units (III) tend to disrupt crystallinity and reduce glass transition temperature while the repeat units derived from TFE (II) tend to increase crystallinity and increase glass transition temperature, the effects of the two groups of repeat units can be traded off against one another. Since some of the repeat units (III), such as vinylidene fluoride, vinyl fluoride, and ethylene, themselves form crystals at high concentrations, while others, such as perfluoroalkyl vinyl ethers or perfluorobutyl ethylene, tend to limit molecular weight, it is found to be particularly effective to employ two or more repeat units (III) in combination, for a total concentration of 10–25 mol-%.

For the purposes of the present invention, the polymer is preferably a low-viscosity liquid at the temperature of the stone surface to which it is applied in order to enhance the uniformity of coating and achieve good coating distribution in a matter of minutes to hours. The desired degree of liquidity is achieved when the glass transition temperature of the substantially amorphous polymer of the invention is below the temperature of application. Additionally, the viscosity of the liquid polymer is determined in part by molecular weight, with lower molecular weight generally associated with lower viscosity. Vinyl fluoride, methyl-vinyl ether, ethylene and similar comonomers each tend to limit the molecular weight of the finished polymer. Thus, one way to tune the polymer viscosity to achieve the optimum for a particular application, is to manipulate the concentrations of those monomers in the polymer. On the other hand, when a solvent is employed during the application of the coating, low molecular weight and low glass transition temperature enhance the solubility of the polymer in the chosen solvent.

In a preferred embodiment, the polymer suitable for the practice of the invention is a liquid, and may be applied to a stone surface directly, without dilution. However, it is preferred to first dissolve the polymer in a solvent to achieve the optimum control over uniformity and thickness of coating.

Coatings formed from the polymer of the invention are particularly useful because of the inherent properties of the polymer, such as lack of crystallinity (polymer is transparent), low surface energy (and hence poor wetting by water or most organic liquids) while exhibiting high surface coverage of stone, low dielectric constant, low index of refraction, low coefficient of friction, low adhesion to other materials, etc.

In the practice of the present invention, one or more of the substantially amorphous fluoropolymers hereinabove described is applied by any convenient method to the surface of the stone which is to be protected from the effects of water and environmental pollutants. It is important that the coating provide a barrier to liquid water with minimal effect on the natural water vapor permeability of the stone. One way of achieving this is to provide a durable coating in as thin a layer as possible on the wall surface of each pore of the stone without actually filling or blocking the pore. This is achieved by using a material of the lowest possible surface tension. Coating materials which exhibit a desirable combination of properties are characterized by pendant groups comprising perfluorinated functional groups in sufficient concentration that the surface presented to incident liquid water such as rainfall is characterized by a high density of the perfluorinated groups and a consequently very low surface tension. In the most preferred embodiment, the polymer suitable for the practice of the present invention comprises 30–50 mol-% of repeat units derived from HFP. The resulting low surface tension is the source of the thermodynamic driving force for complete wetting of the pores in stone as well as for the liquid water repellency of the coated stone. To reduce the kinetic barrier to complete pore wetting, the viscosity should be as low as possible. This represents a particularly desirable attribute of the method of the present invention because the substantially amorphous fluoropolymer employed in the method of the present invention readily forms low viscosity solutions in a number of convenient solvents.

While in no way limiting the scope of the invention, it is estimated that the viscosity of the coating during application of the coating to the stone is preferably less than about 10 Pa-s to achieve optimum coating performance. It will be obvious to one of skill in the art that while it is desirable to employ materials which afford low viscosity solutions, usually associated with low molecular weight or non-polymeric materials, the materials so employed cannot be of such low molecular weight that they evaporate from the stone surface.

It is further preferred that polar groups should be present in the coating material to promote adhesion of the coating material to the stone surface and decrease the tendency of the coating material to continually penetrate to the interior of the stone and reducing surface efficacy in terms of liquid water repellency. Esters, amides, —$CH_2CF_2$— and adjacent —CHCF— moieties are examples of such adhesion-promoting polar groups.

According to the method of the present invention, the substantially amorphous fluoropolymer can be dissolved in a solvent which acts as a volatile diluent in the spraying operation to afford fast penetration at the early stages of coating while providing a high degree of control over the viscosity, the uniformity of coating and the coating thickness.

Solvents suitable for the practice of the present invention include acetone, methyl-ethyl ketone, ethyl acetate, t-butyl acetate, hydrochlorofluorocarbons, perfluorocarbons. In the most preferred embodiment, the substantially amorphous fluoropolymer of the present invention is dissolved in supercritical $CO_2$ according to the methods described in Carbonell et al., WO 99/19080 or in the alternative in U.S. Pat. Nos. 4,923,720; 5,108,799; 5,290,603; and 5,290,604. To achieve solubility in relatively low pressure carbon dioxide, which is desirable for on-site application of coatings, the combination of the molar ratio of hydrogen to fluorine attached to the polymer backbone, the "H:F ratio", is about 0.3 to about 1.0 as described in U.S. Pat. No. 6,034,170. If the polymer molecular weight is less than about 5000 Da, a somewhat broader H:F ratio can be sustained.

Spray-coating of stone is preferably effected from $CO_2$ solutions of 75 weight % or less polymer at 40 to 70° C., 2000 to 4000 psi. To promote polymer absorption into the stone it might also be preferable to add up to about 40 weight % acetone, t-butyl acetate, Oxol 100 (4-chlorobenzotrifluoride), or other such environmentally friendly diluents to the substantially amorphous fluoropolymer.

It will be understood by one of skill in the art that numerous chemical compounds have been identified which may serve as the supercritical fluid for the substantially amorphous fluoropolymer coating composition of the invention. However, $CO_2$ is by far the preferred compound because of the low cost, low toxicity, ready formation of a supercritical fluid, and low environmental impact.

The substantially amorphous fluoropolymer component of the coating composition is generally present in amounts ranging from 1 to 80 weight percent, based upon the total weight of the coating composition. Preferably, the substantially amorphous fluoropolymer component should be present in amounts ranging from about 15 to about 70 weight percent on the same basis.

The supercritical fluid diluent should be present in such amounts that a liquid mixture is formed that possesses such a viscosity that it may be applied as a liquid spray. Generally, this requires the mixture to have a viscosity of less than about 300 centipoise at spray temperature. Preferably, the viscosity of the mixture of components ranges from about 5 centipoise to about 150 centipoise. Most preferably, the viscosity of the mixture of components ranges from about 10 centipoise to about 50 centipoise.

The supercritical carbon dioxide fluid is most preferably present in amounts ranging from about 30 to about 85 weight percent on the total compositional weight, thereby producing a mixture having viscosities from about 10 centipoise to about 50 centipoise at spray temperature.

It is not necessary to form a preliminary solution or dispersion of the preferred substantially amorphous fluoropolymer composition in order to form a low-viscosity solution or dispersion suitable for mixing with the $CO_2$. It is however optional to add a third component to the coating composition of the invention, the third component comprising one or more organic solvents employed for the purpose of improving viscosity control during spraying and "lay-down" of the coating material on the stone.

The organic solvents suitable for the practice of the most preferred embodiment of the invention generally include any solvent or mixture of solvents that is miscible with $CO_2$, is a good solvent for the substantially amorphous fluoropolymer, and is fugitive at the temperature at which the coating is being applied to the stone, normally at temperatures of about 0° C. or above. Preferably, the solvent is also environmentally friendly. Suitable organic solvents include acetone, methyl-ethyl ketone, ethyl acetate, t-butyl acetate, hydrochlorofluorocarbons, and perfluorocarbons with acetone, methyl-ethyl ketone, ethyl acetate and t-butyl acetate preferred.

The coating composition of the invention is sprayed onto a substrate to form a liquid coating thereon by passing the liquid mixture under pressure through an orifice into the environment of the substrate to form a liquid spray.

Spray orifices, spray tips, spray nozzles, and spray guns used for conventional airless and air-assisted airless spraying of coating formulations such as paints, lacquers, enamels, and varnishes, are suitable for spraying the coating composition of the present invention. The spray pressure used in the practice of the present invention is a function of the specific coating formulation. In the case of supercritical fluid solutions, the minimum spray pressure is at or slightly below the critical pressure of the supercritical fluid. Generally the pressure will be below 5000 psi. Preferably, the spray pressure is above the critical pressure of the supercritical fluid and below 3000 psi. If the supercritical fluid is supercritical carbon dioxide fluid, the preferred spray pressure is between 1070 psi and 3000 psi. The most preferred spray pressure is between 1200 psi and 2500 psi.

The spray temperature used in the practice of the present invention is a function of the coating formulation. The minimum spray temperature is about 31° C. The maximum temperature is determined by the thermal stability of the components in the liquid mixture. The preferred spray temperature is between 35° C. and 90° C. The most preferred temperature is between 45° C. and 75° C. Generally liquid mixtures with greater amounts of supercritical carbon dioxide fluid require higher spray temperatures.

One of skill in the art will recognize that the method of the present process, while specifically directed to the protection of stone, may equally be employed to apply coatings to a variety of substrates. Examples of suitable substrates include but are not limited to metal, wood, glass, plastic, paper, cloth, ceramic, masonry, stone, cement, asphalt, rubber, and composite materials.

Through the practice of the present invention, coatings may be applied to substrates in thicknesses of from about 0.5 to 100 micrometers. Preferably, the coatings have thicknesses of from about 1.0 to about 15 micrometers, while most preferably, their thicknesses range from about 1.5 to about 10 micrometers.

The method of the present invention provides a considerable benefit in that the substantially amorphous fluoropolymer coating may be readily removed using common solvents such as acetone, methyl-ethyl ketone, ethyl acetate or t-butyl acetate, if it should be deemed desirable at some point in time following the application thereof.

The coatings on stone produced by the practice of the present invention are highly beneficial to the purpose of protecting the stone from environmental degradation. Two key attributes which are indicative of susceptibility to weathering are water absorption, typically by capillary action through the porous stone structure, and water vapor permeation rate. It is highly desirable that the water absorption of normally highly absorbent stone be reduced by as large a factor as possible, while water vapor permeability, normally high as well, be maintained at a high level. The coated stone of the present invention provides high levels of water vapor permeability by virtue of the thin coatings which are found to be effective in providing the desired high resistance to water penetration.

The method of the present invention and the properties of the coated stone compositions provided thereby are further illustrated in the following specific embodiments.

EXAMPLES

In the following examples, a pressure cell as described in Tuminello et al., J. Appl. Polym. Sci., 56, 495 (1995), was used to evaluate the solubility of the substantially amorphous fluoropolymer specimens below in $CO_2$. The total volume of the cell was about 3.0 ml. Solid fluorinated material solute sufficient to make about a 17 volume percent solution was added to the cell first. A vacuum was applied for a few minutes and then liquid $CO_2$ was added until the cell was filled at its vapor pressure, about 6.2 MPa (900 psi). Pressures could be increased to as high as 31.7 MPa (4600 psi) by pushing a piston through a manifold loaded with $CO_2$. Temperature was increased to as high as 100° C. with an electrical heating band around the pressure chamber. Temperatures as low as about −10° C. were achieved by removing the heating band and packing dry ice around the cell. Cloud points were determined by visual observation through the sapphire windows provided on the cell. The cloud point was determined at constant temperature with decreasing pressure and is defined as that pressure at which the mixture became so opaque that it was no longer possible to see the stirring paddle inside the cell. Cloud point data for each sample are listed below.

In the following examples, the procedures followed in determining water absorption and permeability were essentially those described in Italian standard test methods AA. VV, Assorbimento di acqua per capillarità, Raccomandazione NORMAL 11/85, CNR-ICR, Roma 1985 and 7 AA. VV, Permeabilità al vapor d'acqua, Raccomandazione NORMAL 121/85, CNR-ICR, Roma 1985.

Two stone substrates were employed, each in the form of prism-shaped specimens 5×5×2 cm in size. They were:

(a) Marble—White Carrara marble with grey veins, 99% calcite, polygonal structure and fine grains. Total porosity=3.83±0.2%; saturation index=7.4±0.6%.

(b) Biocalcarenite—Lecce stone composed of Foraminifera with calcareous shell, glauconite grains and very small fragments of quartz. The clasts are bound by a micritic calcitic cement with a low clay content. Total porosity=32 to 40%; saturation index=65±5.0%.

In each example, the average of the results obtained on three separate prism shaped specimens was determined. Five untreated stone specimens of each type were retained as controls. The stone specimens were maintained in a dessicator containing $CaCl_2$ until a constant mass was reached using a lab balance of precision of ±1 mg.

The coating was applied to one face of each stone specimen by painting with a brush as uniformly as possible. This was done after removing the stone from the dessicator. Coating thickness was determined by weighing before and after treatment. The painted stone specimens were then left at room temperature in ambient air for one week to evaporate the solvent and then placed in a dessicator along with the control specimens containing $CaCl_2$ until constant mass was achieved.

Each stone specimen thus brought to constant mass, was removed in turn from the dessicator and placed in contact with a stack of filter paper (1 cm thick; 9 cm diameter) soaked in distilled water. The amount of water absorbed by capillarity was determined by weighing the sample after a fixed time (marble—60 min.; biocalcarenite—20 min.) Protective efficacy (EP %) was calculated by the following expression:

$$E_P\ \% = \frac{(A_{UN} - A_T)}{A_{UN}} \cdot 100$$

where $A_{UN}$ and $A_T$ are the amounts of water absorbed by the untreated and treated samples, respectively.

In the ideal there would be no water absorption, or $E_p\%=100$. In the current state of the art, a very good level of efficacy is considered to be 80 to 90%.

Each stone test specimen was mounted as a lid to a poly(vinyl chloride) test cell containing 10 ml of distilled water. The cell was equipped with neoprene gaskets to keep the sample in place while leaving an area of about 16 cm² through which water vapor could permeate. The cell was then placed in a thermostatic drybox maintained at a constant temperature of 25.0±0.5° C., and containing a sufficient amount of silica gel and calcium chloride to maintain constant relative humidity of 2 to 5%.

A balance was placed in the drybox to monitor weight changes in the cell without the need to open the drybox. The weight of each cell was monitored every 24 hours for several days. Weight loss became constant after a few days. The permeability (P) of the surface of the stone to water vapor was calculated using:

$P = M/A$ (g/m² in 24 hrs.)

where M is the amount of water, in grams, lost in 24 hours and A is the evaporating area, in m², of the system.

The reduction in permeability ($R_p$%) due to the treatment is defined as:

$$R_P\% = \frac{(P_{UN} - P_T)}{P_{UN}} \cdot 100$$

where $P_{UN}$ and $P_T$ are the permeability of the untreated and treated samples, respectively. This procedure is described in more detail elsewhere. The best performance is to have permeability matching that of the untreated sample, or $R_p\% = 0$.

Examples 1 and 2

Following the practice of Example 1 of U.S. Pat. No. 5,478,905, the monomers along with a trace of nitrogen trifluoride were compressed to 103 MPa and bled through a tubular reactor maintained at 300° C. and 96.5 MPa. After a ~1 minute residence time, a solution of polymer in supercritical monomer phase was withdrawn from the back end of the reactor. The solution thus withdrawn was reduced to atmospheric pressure and the polymeric residue collected and devolatilized.

A 25 ml loop off the feed line to a 3.8 liter stirred autoclave was filled with 440 psig of nitrogen trifluoride. The 3.8 liter autoclave was then filled via the feed line with 60 g of tetrafluoroethylene, 2000 g of hexafluoropropylene, 20 grams of vinyl fluoride, and 20 g of ethylene, using a portion of the hexafluoropropylene to blow the nitrogen trifluoride into the autoclave. The liquid monomer phase was pumped off the bottom of the autoclave, pressurized to ~103 MPa, and then recirculated back to the autoclave. After at least 10 minutes of such recirculation, monomer was bled off the recirculation loop at ~10 to 12 grams/minute though a 225° C. preheated line to a 10 cc reactor maintained at ~96.5 MPa and 300° C., followed by collection at atmospheric pressure. Flow rate through the reactor was ca. 10–12 g/min. Over a period of 120 minutes about 1300 g of monomer were passed through the reactor. Letting the reaction mixture back down to atmospheric pressure gave a yellow, foamy fluid that was allowed to first evaporate down overnight and then dried further overnight in a 150° C. vacuum oven. This gave 176 g of a highly viscous fluid having an inherent viscosity of 0.067 in $CF_3CFHCFHCF_2CF_3$ solvent at 25° C. The composition was found by NMR to be 12.7 mole % vinyl fluoride, 38.6 mole % hexafluoropropylene, 23.0 mole % ethylene, 25.7 mole % tetrafluoroethylene. The glass transition temperature was −10° C. as determined by differential scanning calorimetry in the second heating at 10° C./min heating rate in nitrogen.

$CO_2$ solubility was determined according to the method hereinabove described, and the results are shown in Table 1.

TABLE 1

| $CO_2$ Solubility | |
|---|---|
| Temperature (° C.) | Cloud Point (psi) |
| 21 | 1810 |
| 24 | 2180 |
| 33 | 2550 |
| 34 | 2800 |
| 37 | 2810 |
| 42 | 3000 |
| 45 | 3220 |
| 47 | 3290 |
| 49 | 3710 |
| 51 | 3580 |
| 52 | 3650 |

1 g of the solid polymer prepared above was dissolved in 99 g of 1,1,2-trichlorotrifluoroethane at room temperature. The resulting solution was applied to three stone specimens each of the white Cararra marble (Example 1) and Lecce stone (Example 2), as hereinabove described. The specimens were allowed to stand for 1 week, after which they were subject to the procedures of dessication, water absorption determination, and water vapor permeability according the methods hereinabove described. Results are shown in Table 2.

Comparative Example 1

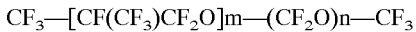

The test procedures of Example 1 were followed employing Fomblin® YR, a perfluorinated polyether available from Ausimont/Montefluos, Montedison/Montefluos Group, Milano, Italy. Fomblin® YR is the material currently preferred in commercial stone preservation applications. Stone test specimens were prepared and tested as hereinabove described. Only the biocalcarenite was tested. The amount of material applied was that followed in current commercial practice. Results are in Table 2.

TABLE 2

| Results of Coating on Stone | | | | |
|---|---|---|---|---|
| Example | Substrate | Coverage (g/sq.m.) | Protective Efficacy ($E_P$ %)* | Reduction in Permeability ($R_P$ %)** |
| 1 | Marble | 8.5 ± 0.40 | 84 ± 3 | 38 |
| 2 | Biocalcarenite | 18.8 ± 0.78 | 85 ± 3 | 30 |
| Comp. Ex. 1 | Biocalcarenite | 49 | 18 | Not Determined |
| Control | Marble | None | 0 | 0 |
| Control | Biocalcarenite | None | 0 | 0 |

*Goal is 100%
**Goal is 0%

Comparative Example 2

Following the method described in F. Piacenti and M. Camaiti, J. Fluorine Chem., 69 (1994), 227–235, the monofunctional acid fluoride precursor of a random perfluoropolyether of similar structure to the one in Comparative Example 1 was esterified and then condensed with hexamethylene diamine to form the diamide functionalized perfluoropolyether material with a MW of about 1800 Da. This material is considered the state of the art for providing a combination of high water repellency and low water permeability, as described in F. Piacenti, "The Conservation of Monumental Buildings: Recent Scientific Developments", a lecture presented at the 2nd International Congress on Science and Technology for the Safeguard of Cultural Heritage in the Mediterranean Basin—Paris—Jul. 5 to 9, 1999.

Biocalcarenite specimens were coated with 48 g/m² of the perfluoropolyether diamide so prepared according to the methods of Comparative Example 1. $E_p$ was 55% as determined as hereinabove described.

What is claimed is:

1. A process for protecting stone comprising:
   contacting stone with a substantially amorphous fluoropolymer comprising
   (a) 30 to 50 mole percent of repeat units of the formula $$—CF_2—CF(CF_3)— \quad (I)$$

derived from hexafluoropropylene;
   (b) 25 to 50 mole percent of repeat units of the formula $$—CF_2—CF_2— \quad (II)$$

derived from tetrafluoroethylene; and
   (c) about 10 to about 25 mol-% of repeat units selected from the group consisting of $$—CF_2CFX—, —CH_2—CHR—, —CH_2CF_2— \quad (III)$$

and mixtures thereof wherein X is H or perfluoroalkoxy having 1–20 carbons, and R is H, alkyl, alkoxy, perfluoroalkyl, F.

2. The process of claim 1 wherein the repeat unit (III) is selected from the group consisting of vinyl fluoride, vinylidene fluoride, perfluoroalkylvinyl ethers, perfluorobutylethylene, alkylvinyl ethers, ethylene, and combinations thereof.

3. The process of claim 1 wherein the amorphous polymer is a liquid.

4. The process of claim 1 wherein the backbone H:F ratio of said amorphous fluoropolymer is about 0.3 to about 1.0.

5. The process of claim 1 further comprising forming a solution of said substantially amorphous fluoropolymer prior to contacting said stone therewith, wherein said stone is contacted with said solution of said substantially amorphous fluoropolymer.

6. The process of claim 5 wherein said solution comprises supercritical $CO_2$.

7. The process of claim 6 wherein said solution further comprises an organic solvent which is fugitive at a temperature at or above about 0° C.

8. The process of claim 7 wherein said organic solvent is selected from the group consisting of acetone, methylethyl ketone, ethyl acetate, t-butyl acetate, hydrochlorofluorocarbons, and perfluorocarbons.

9. A composition comprising stone and a substantially amorphous fluoropolymer in the form of a coating thereupon, the substantially amorphous fluoropolymer comprising:
   (a) 30 to 50 mole percent of repeat units of the formula $$—CF_2—CF(CF_3)— \quad (I)$$

derived from hexafluoropropylene;
   (b) 25 to 50 mole percent of repeat units of the formula $$—CF_2—CF_2— \quad (II)$$

derived from tetrafluoroethylene; and
   (c) about 10 to about 25 mol-% of repeat units selected from the group consisting of $$—CF_2CFX—, —CH_2—CHR—, —CH_2CF_2— \quad (III)$$

and mixtures thereof wherein X is H or perfluoroalkoxy having 1–20 carbons, and R is H, alkyl, alkoxy, perfluoroalkyl, F.

10. The composition of claim 9 wherein the repeat unit (III) is selected from the group consisting of vinyl fluoride, vinylidene fluoride, perfluoroalkylvinyl ethers, perfluorobutylethylene, ethylene, alkylvinyl ethers and combinations thereof.

11. The composition of claim 9 where said coating has a thickness in the range of 1.5 to 10 micrometers.

12. The composition of claim 9 wherein the backbone H:F ratio of said amorphous fluoropolymer is about 0.3 to about 1.0.

* * * * *